Sept. 27, 1955 D. K. GANNETT 2,719,272

REDUCTION OF TRANSIENT EFFECTS IN WIDE BAND TRANSMISSION SYSTEMS

Filed Aug. 24, 1950 2 Sheets-Sheet 1

INVENTOR
D. K. GANNETT
BY
Hugh S. Wertz
ATTORNEY

INVENTOR
D. K. GANNETT
BY
Hugh S. Wertz
ATTORNEY

United States Patent Office 2,719,272

Patented Sept. 27, 1955

2,719,272

REDUCTION OF TRANSIENT EFFECTS IN WIDE BAND TRANSMISSION SYSTEMS

Danforth K. Gannett, Mountain Lakes, N. J., assignor to Bell Telephone Laboratories, Incorporated, New York, N. Y., a corporation of New York Application August 24, 1950, Serial No. 181,271

8 Claims. (Cl. 333—75)

This invention relates to the translation and transmission of electric communication signals, particularly television image signals and the like.

The principal object of the invention is to effect a substantial reduction of the objectionable transient voltages created by frequency band limitation in television circuits.

Other objects are to provide methods and apparatus for accomplishing this principal object.

It is a feature of many of the means commonly employed in the communication art for the transmission from place to place of electrical signals containing varying information that the transmission characteristic is reasonably constant over a portion of the frequency spectrum and then drops, or "cuts off," quite sharply. This is, for example, particularly true of the coaxial cables in general use for the transmission over long distances of electric signals such as television image signals. The sharp cut-off of these cables has been found to be responsible for the creation of certain transient voltages, which in many cases exceed the threshold of visibility in their amplitude and thereby become both noticeable and objectionable to the observer.

In accordance with the invention and in furtherance of its broad object, these undesired transient oscillations are eliminated by the use of a receiving circuit having multiple paths with slightly different cut-off frequencies, thereby creating transients of slightly different periods which will beat with others and cause a faster rate of decay over the interval of interest.

In the situation where a coaxial line is the offending circuit member, an electrical filter of cut-off frequency differing slightly from that of the line is placed in parallel with the output of the line, so that the transients produced by the line are attenuated by beating with those created by the filter. A delay network is inserted in whichever branch of the receiving circuit the signals may need retarding to attain the correct phase relationship. It is, of course, also in accordance with the invention to use a plurality of filter paths of different cut-off frequencies in order to secure a more rapid transient decay.

In the circumstance that the cut-off of the line is unstable and therefore unreliable, a further modification of the invention provides that all the branches of the network have filters in them with cut-offs a little different from the line cut-off, so that the filters themselves control the periods of the transients.

The invention will be more fully understood from the following detailed description of certain illustrative embodiments thereof taken in connection with the accompanying drawings, in which:

Fig. 1 is a plot of the transient wave produced by a signal consisting of a sudden unit change in amplitude traveling through an ideal filter;

Fig. 2 comprises a series of plots of the envelopes of the transient ripples produced by various circuit combinations of filters as well as a plot of the threshold of visibility of television signals;

Figure 1:
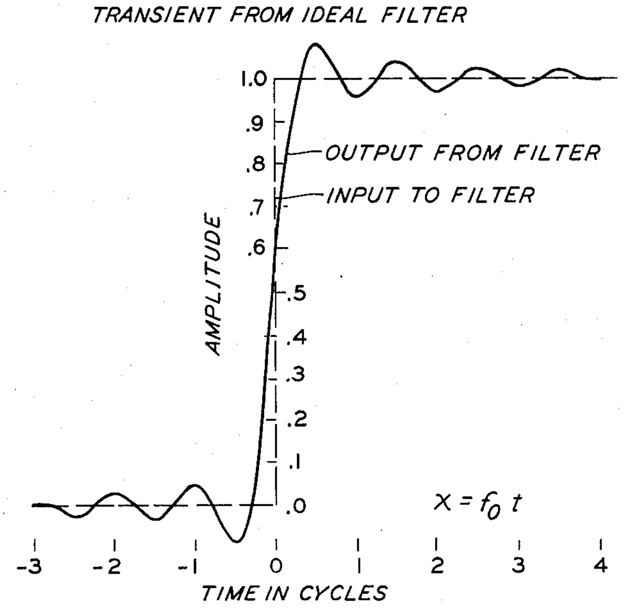

When an abrupt signal is sent through a circuit having a sharp cut-off, the output signal is followed, and may be preceded, by an oscillatory transient which decreases in amplitude with distance from the signal. In the case of television image signals, this produces objectionable multiple outlines around sharp images having vertical edges. For purposes of illustration, there is shown in Fig. 1 a typical output signal resulting from the transmission through an ideal (i. e., having no attenuation or phase distortion within the pass band, and infinite attenuation at all other frequencies) low pass filter of a signal consisting of a sudden unit change in amplitude. The time scale is given in terms of cycles of the cut-off frequency of the filter, and it will be seen that the oscillatory transient has the same period as the cut-off frequency and that its amplitude decreases logarithmically with time.

Figure 2:
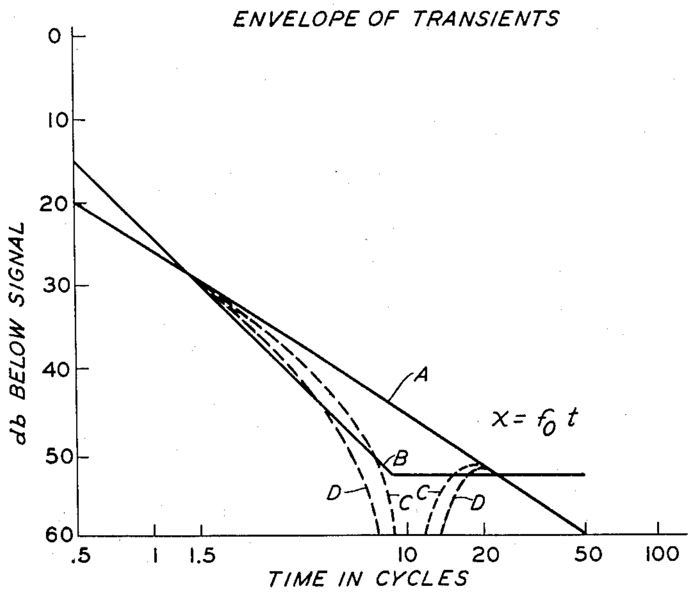

To illustrate further the nature of these transient oscillations, the envelope of the peaks of the transients is plotted as curve A of Fig. 2 in terms of decibels below the signal amplitude versus time in periods of the cut-off frequency. It can readily be shown that this curve has a 6-decibel per octave slope when plotted on a logarithmic scale. Experiment has shown that in a television image the threshold of visibility of an echo or a transient also decreases with distance from the main image, larger values being tolerated very near the image than further away, and curve B of Fig. 2 is a plot of an empirically determined limit of visibility, the time parameter being in terms of periods of the maximum frequency. The threshold value is clearly a function of the distance on the screen, that is, a function of absolute time, and to plot it in terms of periods therefore requires making an assumption as to the frequency. Thus, in plotting curve B, a frequency of 2.7 megacycles, the cut-off of the coaxial cables employed in long-distance television transmission, has accordingly been assumed as a convenient example. It will be noted that this curve has a constant slope up to the point where the transients are about 52.5 decibels weaker than the signal, which, under normal conditions, is approximately the threshold of visibility for any signal.

Thus, the actual transients shown by curve A are above the limit of visibility from about 1.5 to 20 cycles, and are therefore objectionable, but if they could be made to decay a little more rapidly for the first 20 cycles, they would fall below the threshold curve and become harmless. In accordance with the invention, a more rapid decay of the transients can be accomplished by the circuit shown in Fig. 3, which consists of two parallel paths 10 and 11 equipped with low pass filters 13 and 14 of slightly different cut-off frequencies $f_1$ and $f_2$. Assuming that these are ideal filters, the output wave from each filter will be as shown in Fig. 1, except for a slight change in the time scale.

It can be shown that except very near zero, the transient wave from a filter of cut-off $f$ due to the application of a unit change in amplitude is given by $$y=\frac{1}{2\pi^2 ft}\cos 2\pi ft$$

where $t$ is time in seconds. In accordance with the invention, for the upper branch 10 of Fig. 3, the cut-off frequency $f$ can be made slightly different from a mean frequency $f_0$, i. e., $f=f_1=f_0-\Delta$. Similarly, for the lower branch, the cut-off frequency $f$ can be set $f=f_2=f_0+\Delta$, so that the difference in cut-off frequency between the upper and lower branches is equal to $2\Delta$. In addition, the gains in the two branches are adjusted by the ratios $f_1/2f_0$ and $f_2/2f_0$, respectively, so that the output waves have the same amplitude. It is thus readily demonstrable that the sum of the output waves from the two branches becomes $$y=\frac{1}{2\pi^2 f_0 t}\cos(2\pi\Delta t)\cos(2\pi f_0 t)$$

This is evidently identical with the transient wave which would emerge from a filter of cut-off $f_0$, except that it is multiplied by $\cos 2\pi\Delta t$. It is obvious that this factor attenuates the transients to zero when $$t=\frac{1}{4\Delta}$$

and thus, for purposes of illustration, this zero point can be made to occur after 10 cycles of $f_0$ (i. e., $f_0 t=10$) by setting $\Delta=f_0/40$. In the example chosen, the difference in cut-offs of the two filters ($2\Delta$) is equal to 5 per cent of $f_0$.

Curve C of Fig. 2 gives the envelope of the transients resulting from this arrangement (i. e., the circuit of Fig. 2 employing the exemplary values chosen above). It will be seen that the transients still exceed the threshold curve a little, but that a considerable improvement has been obtained. In accordance with the invention, still greater improvement can be obtained by using more than two paths. For instance, in an illustrative embodiment of the invention with three paths, the amplitude of the combined transient wave can, as may readily be shown, be given by the relationship $$y=\frac{1}{2\pi^2 f_0 t}\cos^2(2\pi\Delta t)\cos(2\pi f_0 t)$$

The envelope for the transients in this case, which is above the limit curve for a shorter time than curve C, is shown as curve D of Fig. 2.

In accordance with the invention, any desired transient envelope can be obtained by using a sufficient number of filters and properly adjusting the gain in each, but it will be instructive at this point to discuss several of the principal specific embodiments of the invention in terms of a system having two branches. This simplest arrangement of the invention has been chosen purely for illustrative purposes, and it is to be understood that features thereof are equally applicable to other embodiments of the invention.

Figure 3:
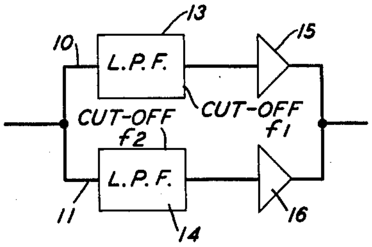
Fig. 3 shows, in block form, one exemplary embodiment of the invention, in which two filters are employed.
Figure 4:
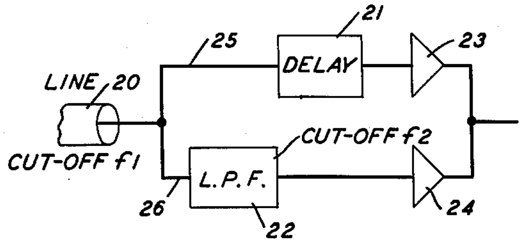
Fig. 4 depicts, also in block form, an illustrative embodiment of the invention in which a coaxial line is a circuit member.
Figure 5:
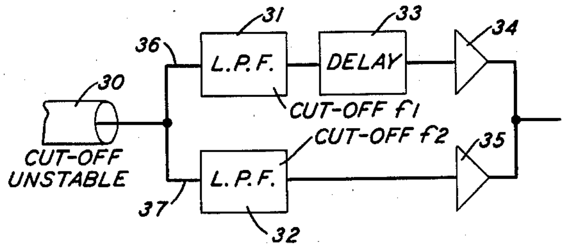
Fig. 5 shows, in block form, another specific embodiment of the invention in which a coaxial line is a circuit member, but in which there is a filter in both branches of the network.

Figs. 4 and 5 show two specific embodiments of the invention in which one of the circuit elements is a coaxial cable transmission line, such as is used in the long-distance transmission of television image signals, for example. If the line is sufficiently stable in its characteristics, the arrangement of Fig. 4 is highly satisfactory. In that particular embodiment of the invention, the actual transmission line with its cut-off is substituted for one of the filters of the arrangement of Fig. 3. As shown in Fig. 4, the signals are received through a line circuit 20 which cuts off at a specific frequency $f_1$. These signals are sent through the upper branch 25 of the transient suppression circuit and also into the lower branch 26 of the circuit through a low pass filter 22 having a cut-off $f_2$, which is slightly lower than that of the line. Thus, the period of the transients from the latter circuit is $f_2$ and the period for the upper circuit is $f_1$. In order that the transients may be in the same phase at their start, a certain amount of delay can, in accordance with invention, be added to either the upper or lower branch of the transient suppression circuit. This delay, which is furnished by any of the means common in the art for causing delay in electrical networks, is, in one convenient exemplary arrangement of the invention, provided by a short piece of coaxial line. Although in Fig. 4 the delaying means 21 is shown as appearing in the upper branch of the transient suppression circuit, it is to be understood that it is in accordance with the invention to have the delay inserted in whichever branch the signals may need retarding to attain the correct phase relationship. The effective cut-off of the system is lowered slightly to the mean of $f_1$ and $f_2$, and the transients are in phase opposition and therefore have a net amplitude of zero at a time equal to $$\frac{1}{2(f_1-f_2)}$$

i. e., when $t=1/4\Delta$.

If the cut-off of the line is unstable and therefore unreliable, the illustrative arrangement of the invention shown in Fig. 5 can be employed. In this arrangement, both branches of the network have filters in them with cut-offs a little lower than the line cut-off, so that the filters themselves control the periods of the transients. Just as in the system of Fig. 4, it is in accordance with the invention to add a certain amount of delay to one branch or the other if needed.

Whether the circuit is set up according to Fig. 3 or Fig. 4 or Fig. 5, the gain in each arm is adjusted to the desired amount by the use of attenuating or amplifying means characterized by lack of phase distortion or frequency discrimination. These means (elements 15 and 16 of Fig. 3, 23 and 24 of Fig. 4, and 34 and 35 of Fig. 5) comprise any of the several devices well known in the electrical art to accomplish this function, such as, for example, ordinary resistor pads or simple electronic amplifiers.

Figure 6:
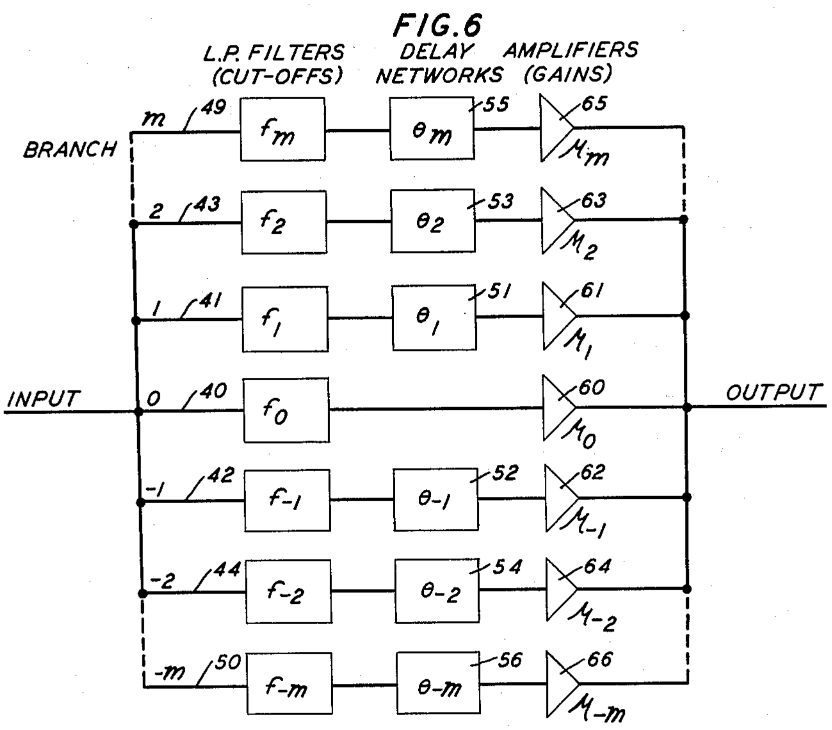
Fig. 6 illustrates the "general case" of the invention, that is, a specimen multi-path arrangement of the transient suppression circuit.

The invention in one of its broad aspects is illustrated in Fig. 6. It has already been shown that any desired transient envelope can be obtained by using a sufficient number of suitable filters and properly adjusting the gain in each branch, and Fig. 6 is a schematic representation of an illustrative multi-path embodiment of the invention.

In this general case, there are $2m+1$ branches of the transient suppression circuit, consisting of a center branch, with cut-off $f_0$ and gain $\mu_0$, and $m$ pairs of branches, the two branches of each pair having cut-off frequencies equally spaced above and below $f_0$ by some multiple of a frequency increment $\Delta$. The two branches of pair $r$, for example, have cut-off frequencies of $f_0+r\Delta$ and $f_0-r\Delta$, and should have gains of $$1/2\mu_0 b_r\frac{(f_0+r\Delta)}{f_0}$$

and $$1/2\mu\epsilon_0 b_r\frac{(f_0-r\Delta)}{f_0}$$

respectively, where $b_r$ is a Fourier series coefficient. It can readily be shown that the sum of the transients from this pair of branches will be:

$$\mu_0 b_r\cos 2\pi r\Delta t\,\frac{\cos 2\pi f_0 t}{2\pi^2 f_0 t}$$

It follows from this expression that the sum of the transients from all the branches will be equal to the transient from the middle branch modified by the factor $$U=\sum_{r=0}^{r=m} b_r\cos 2\pi r\Delta t$$

The factor U is evidently a Fourier series representing a periodic wave of period $$\frac{1}{\Delta}$$

and by suitably choosing the coefficients $b_r$ and using enough filter branches (i. e., making $m$ large), it can be made to simulate any desired shape up to some fraction of that period. In the figure, the center branch 40 is designated branch O, with the branches 41 and 42 on either side of the center corresponding to $r=1$ and $r=-1$, respectively. Branches 43 and 44 ($r=2$ and $r=-2$) are still further out and the outermost branches 49 and 50 correspond to $r=m$ and $r=-m$. Amplifiers 60 through 66 (which are numbered so that the unit digits correspond to those of the branch designations) can be used as required in the various branches.

It is obvious that a means (51 to 56) for causing delay to be inserted in several of the branches in order to attain the correct phase relationships may be required in this general case of the invention, just as it may be required in the previously discussed special cases, and thus, in accordance with the invention, ordinary delay networks, such as are in common use in the electrical art, are inserted in the various arms of the transient suppression circuit in one embodiment and sections of coaxial line are used to effect the time delay in another embodiment. The practice of the invention is not, however, limited to these two exemplary techniques of phase correction, but comprises as well any of the other means well known in the art for causing fixed amounts of time delay in electrical signals.

It is to be understood that the above-described arrangements, both general and special cases, are illustrative of the application of the principles of the invention. Numerous other arrangements may be devised by those skilled in the art without departing from the spirit and scope of the invention.

What is claimed is:

1. In combination, a first means for transmitting a signal occupying a wide frequency band, said means having the characteristic that certain signals transmitted therethrough set up oscillatory transients therein, a second transmitting means in parallel with said first means, said second means having the characteristic that it transmits substantially the same band as said first means but has a slightly different cut-off frequency than the first means, the two cut-off frequencies having a predetermined relationship with one another, and means for passing a wide-band signal through both said means, whereby the transients produced in the two transmitting means by a signal passing through both beat with each other and are thereby attenuated more rapidly than would be the case of either means acting alone.

2. In combination with a transmitting means which transmits a band of frequencies up to a limiting frequency and sharply cuts off above that frequency, a means connected in tandem with said transmitting means consisting of parallel branches each containing a filter capable of passing substantially the same band of frequencies but each having a cut-off frequency slightly different from that of each of the other of said branches, whereby the oscillatory transients produced in the different branches by a signal passing through said branches beat together and are thereby attenuated more rapidly than would be the case for the original transmitting means alone.

3. A transmission means for obtaining a sharp frequency cut-off with reduced transients, said means consisting of parallel branches each containing a filter capable of passing substantially the same band of frequencies and each having a sharp cut-off, the cut-off frequencies of the various filters being each slightly different from each other, so that the transient oscillations produced therein by a signal passing therethrough beat together and are rapidly extinguished.

4. In combination, a plurality of means for transmitting a signal occupying a wide frequency band, each of said means having the characteristic that certain signals transmitted therethrough set up oscillatory transients therein, each of said means being connected in parallel with the remainder of said plurality of means and each of said means being capable of passing substantially the same band of frequencies but each having a cut-off frequency different from that of every other of said means, the several cut-off frequencies having a predetermined relationship with one another, and means for passing a wide band signal through said plurality of means, whereby the transients produced in each transmitting means by a signal passing through all of said means beat with the transients produced in the remainder of said means and are thereby attenuated more rapidly than would be the case of any single means acting alone.

5. In combination with a coaxial line adapted to transmit a signal occupying a wide frequency band, an output circuit to which signals from said coaxial line are applied, a transmitting means having the characteristic that certain signals transmitted therethrough set up oscillatory transients therein, said means being connected in parallel with said output circuit, said transmitting means being capable of passing substantially the same band of frequencies as said coaxial line but having a slightly different cut-off frequency than the coaxial line, the two cut-off frequencies having a predetermined relationship with one another, and means for passing a wide-band signal through both said transmitting means and said output circuit, whereby the transients produced in the coaxial line by a signal passing through it beat with the transients produced in the transmitting means by said signal passing through said means and are thereby attenuated more rapidly than would be the case of the coaxial line acting alone.

6. In combination, a first means for transmitting a signal occupying a wide frequency band, said means having the characteristic that certain signals transmitted therethrough set up oscillatory transients therein, a second transmitting means in parallel with said first means, said second means being capable of passing substantially the same band of frequencies as said first means but having a slightly different cut-off frequency than the first means, the two cut-off frequencies having a predetermined relationship with one another, means for passing a wide-band signal through both said means, and means for causing time delay in one of said means to maintain the same phase relationship between the transients at the outputs as at the inputs of said parallel connected means, whereby the transients produced in the two transmitting means by a signal passing through both beat with each other and are thereby attenuated more rapidly than would be the case of either means acting alone.

7. In combination, a first means for transmitting a signal occupying a wide frequency band, said means having the characteristic that certain signals transmitted therethrough set up oscillatory transients therein, a second transmitting means in parallel with said first means, said second means being capable of passing substantially the same band of frequencies as said first means but having a slightly different cut-off frequency than the first means, the two cut-off frequencies having a predetermined relationship with one another, means for passing a wide-band signal through both said means, and means for adjusting the gain of one of said means with respect to the other to maintain the output waves of said parallel means at the same amplitude, whereby the transients produced in the two transmitting means by a signal passing through both beat with each other and are thereby attenuated more rapidly than would be the case of either means acting alone or of both means acting in combination with each other but without said variation of gain.

8. In combination, a plurality of means for transmitting a signal occupying a wide frequency band, each of said means having the characteristic that certain signals transmitted therethrough set up oscillatory transients therein, each of said means being connected in parallel with the remainder of said plurality of means and each of said means being capable of passing substantially the same band of frequencies as said first means but having a slightly cut-off frequency different from that of every other of said means, the several cut-off frequencies having a predetermined relationship with one another, means for passing a wide band signal through said plurality of means, and means for causing delay in at least one of said means to maintain the same phase relationship between the transients at the outputs as at the inputs of said parallel connected means, whereby the transients produced in each transmitting means by a signal passing through all of said means beat with the transients produced in the remainder of said means and are thereby attenuated more rapidly than would be the case of any single means acting alone.

References Cited in the file of this patent

UNITED STATES PATENTS

| | | |
|---|---|---|
| 1,681,252 | Nyquist | Aug. 21, 1928 |
| 1,792,001 | Craig | Feb. 10, 1931 |
| 1,849,656 | Bennett | Mar. 15, 1932 |
| 1,869,031 | Turney | July 26, 1932 |
| 1,882,631 | Jaumann | Oct. 11, 1932 |
| 2,226,728 | Lalande et al. | Dec. 31, 1940 |
| 2,340,364 | Bedford | Feb. 1, 1944 |